(12) United States Patent
Kaneda et al.

(10) Patent No.: US 11,614,048 B2
(45) Date of Patent: Mar. 28, 2023

(54) INJECTION CONTROL DEVICE

(71) Applicant: DENSO CORPORATION, Kariya (JP)

(72) Inventors: Minori Kaneda, Kariya (JP); Yohei Suganuma, Kariya (JP); Akira Tachiki, Kariya (JP)

(73) Assignee: DENSO CORPORATION, Kariya (JP)

( * ) Notice: Subject to any disclaimer, the term of this patent is extended or adjusted under 35 U.S.C. 154(b) by 71 days.

(21) Appl. No.: 17/386,201

(22) Filed: Jul. 27, 2021

(65) Prior Publication Data

US 2022/0034278 A1 Feb. 3, 2022

(30) Foreign Application Priority Data

Jul. 29, 2020 (JP) .............................. JP2020-128238

(51) Int. Cl.
*F02D 41/22* (2006.01)
*F02D 41/40* (2006.01)

(52) U.S. Cl.
CPC ........... *F02D 41/401* (2013.01); *F02D 41/22* (2013.01); *F02D 2041/224* (2013.01)

(58) Field of Classification Search
CPC ...... F02D 41/401; F02D 41/22; F02D 41/221; F02D 41/402; F02D 41/20; F02D 2041/224; F02D 2041/2006; F02D 2041/227; F02D 2041/2058; Y02T 10/40
USPC ......... 701/103–105, 107; 123/472, 478, 479, 123/480, 490
See application file for complete search history.

(56) References Cited

U.S. PATENT DOCUMENTS

2020/0284214 A1 9/2020 Inaba et al.

FOREIGN PATENT DOCUMENTS

JP 2016-033343 A 3/2016

*Primary Examiner* — Hai H Huynh
(74) *Attorney, Agent, or Firm* — Posz Law Group, PLC

(57) ABSTRACT

An injection control device includes: an instruction output unit outputting an instruction energization time that is an instruction value of an energization time of a fuel injection valve corresponding to a target injection amount; an energization controller controlling energization of the fuel injection valve based on the instruction energization time; an area corrector correcting an area of an electric current flowing through the fuel injection valve when the fuel injection valve is driven by the electric current, calculating a correction time of the energization time, and correcting the instruction energization time; an abnormality determiner determining that an abnormality related to the area correction has occurred when the correction time reaches a predetermined upper limit value; and a normal-return determiner executing, after the abnormality determiner determines that the abnormality related to the area correction has occurred, a normal-return determination at an execution timing of when a degree of influence of the abnormality on an emission becomes equal to or less than a predetermined value, for determining whether or not an abnormal state in which the abnormality related to the area correction has been caused has returned to a normal state.

12 Claims, 6 Drawing Sheets

INJECTION CONTROL DEVICE

CROSS REFERENCE TO RELATED APPLICATION

The present application is based on and claims the benefit of priority of Japanese Patent Application No. 2020-128238, filed on Jul. 29, 2020, the disclosure of which is incorporated herein by reference.

TECHNICAL FIELD

The present invention generally relates to an injection control device that controls fuel injection to an internal combustion engine by driving a fuel injection valve by supplying thereto an electric current.

BACKGROUND ART

In recent years, with the tightening of PN (Particulate Number) regulations, microinjection, that is, partial lift injection, has come to be widely used, and high injection accuracy is required for improving fuel efficiency and reducing harmful substance emissions. Note that PN is an abbreviation for Particulate Number. Therefore, an energization current profile is determined according to a target injection amount, and the injection control device performs valve opening control of supplying an electric current to the fuel injection valve based on the energization current profile.

SUMMARY

It is an object of the present invention to provide an injection control device that is capable of determining whether or not an abnormal state in which an abnormality related to area correction has occurred has returned to a normal state without causing deterioration of emission.

DETAILED DESCRIPTION

Figure 1:
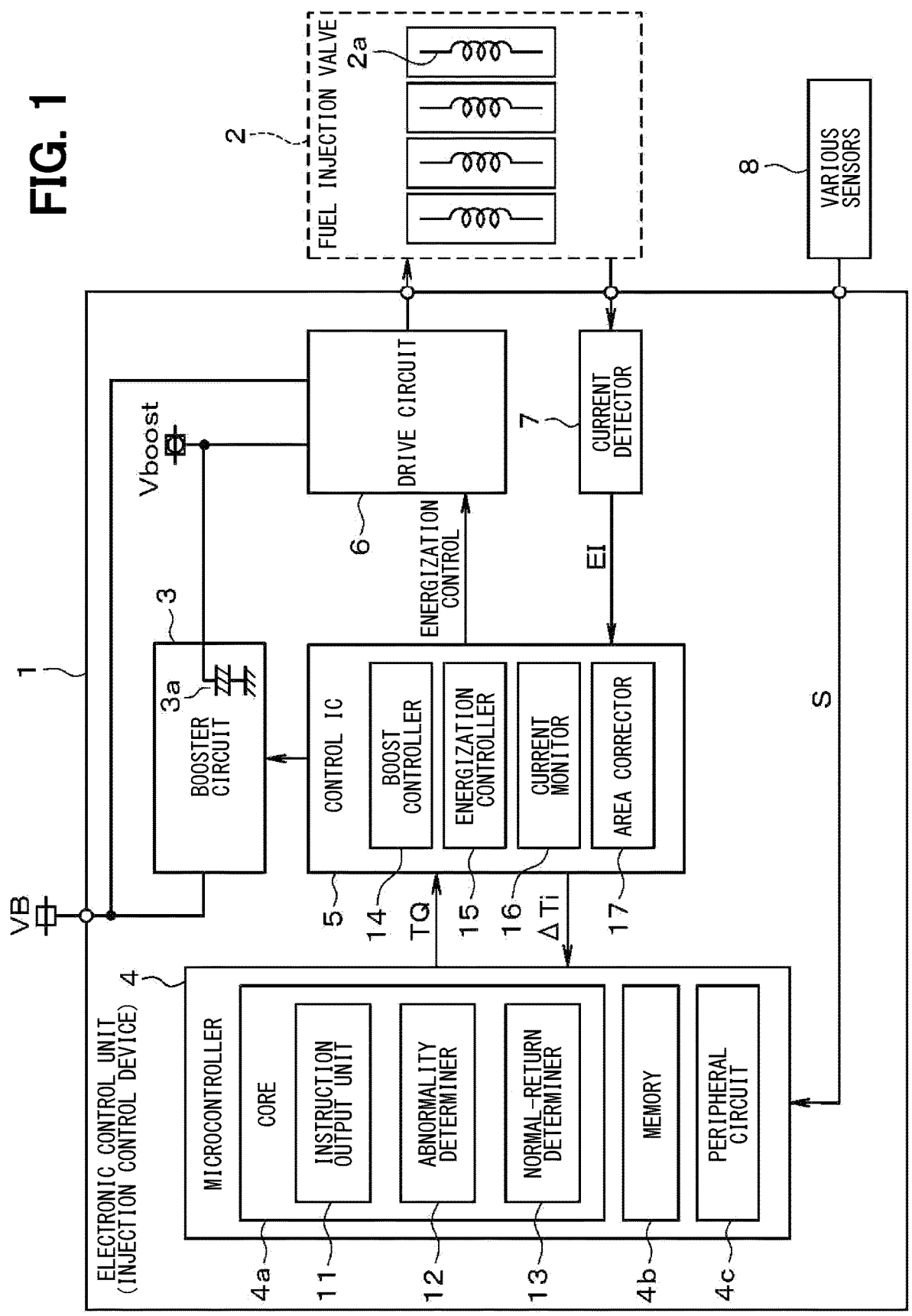
FIG. 1 is a diagram schematically showing an electrical configuration of an injection control device according to a first embodiment.

Hereinafter, multiple embodiments applied to a direct injection control of a gasoline engine as an internal combustion engine of an automobile are described with reference to the drawings. In each of the embodiments, substantially same components are designated by the same reference numerals and description thereof is omitted.

First Embodiment

The first embodiment of the present disclosure is described with reference to FIGS. 1 to 6. As shown in FIG. 1, an electronic control unit 1 of the present embodiment functions as an injection control device that controls fuel injection of a fuel injection valve 2 provided in each cylinder of the engine. In the present disclosure, the electronic control unit may be referred to as an ECU.

The fuel injection valve 2 is also called an injector, and by energizing a solenoid coil 2a to drive a needle valve, fuel is directly injected into each cylinder of the engine. Although a 4-cylinder engine is taken as an example in FIG. 1, it can also be applied to a 3-cylinder, 6-cylinder, 8-cylinder engine, or the like. It may also be applied to an injection control device for a diesel engine. The ECU 1 includes an electrical configuration as a booster circuit 3, a microcomputer 4, a control IC 5, a drive circuit 6, and a current detector 7.

The microcomputer 4 includes one or more cores 4a, a memory 4b such as a ROM and a RAM, and a peripheral circuit 4c such as an A/D converter. Further, a sensor signal or signals S from various sensors 8 for detecting an operating state of the engine and the like are input to the microcomputer 4. As described later, the microcomputer 4 obtains a target injection amount, which is a target value of a fuel injection amount, based on a program stored in the memory 4b, the sensor signal S obtained from the various sensors 8, and the like. Note that the target injection amount is synonymous with an instruction injection amount which is an instruction value of the fuel injection amount and a required injection amount which is a required value of the fuel injection amount.

The various sensors 8 include an A/F sensor provided in an exhaust path of the engine and detecting an air-fuel ratio, that is, an A/F value of the exhaust of the internal combustion engine. Although not shown, the various sensors 8 include a water temperature sensor that detects temperature of a cooling water of the engine, a crank angle sensor that detects a crank angle of the engine, and an air flow meter that detects an intake air amount of the engine, a fuel pressure sensor that detects the fuel pressure when injecting fuel into the engine, a throttle opening sensor that detects the throttle opening, and the like, in addition to the A/F sensor.

A core 4a of the microcomputer 4 includes functional blocks such as an instruction output unit 11, an abnormality determiner 12, and a normal-return determiner 13. Each of these functional blocks is realized by executing a process corresponding to the computer program when executing, by the core 4a, the computer program stored in the memory 4b or the like, that is, it is realized/implemented by software.

The instruction output unit 11 grasps an engine load based on the sensor signal S of the various sensors 8, calculates a target torque required for the engine based on the engine load, and calculates the target injection amount based on the target torque. Further, the instruction output unit 11 generates an instruction energization time which is an instruction value of the energization time of the fuel injection valve 2 corresponding to the target injection amount, and an instruction signal TQ indicating an injection start instruction time t0 and the like, which is an instruction value of a fuel injection start time, and outputs the instruction signal TQ to the control IC 5. Note that the abnormality determiner 12 and the normal-return determiner 13 are described later.

The control IC 5 is, for example, an integrated circuit device using an ASIC, and, although not shown, the control IC 5 includes, for example, a logic circuit, a control subject such as a CPU, a storage unit such as a RAM, a ROM, or an EEPROM, and a comparator using a comparator circuit The control IC 5 performs a current control of the fuel injection valve 2 and the like via the drive circuit 6 according to its hardware and software configurations. The control IC 5 has functions as a boost controller 14, an energization controller 15, a current monitor 16, and an area corrector 17.

Although detailed illustration is omitted, the booster circuit 3 is configured such that a battery voltage VB is input, the battery voltage VB is boosted, and a boost capacitor 3a as a charging unit is charged with a boost voltage Vboost. The boost controller 14 controls the operation of the booster circuit 3, boosts and controls the input battery voltage VB, and charges the boost voltage Vboost of the boost capacitor 3a to a full charge voltage. The boost voltage Vboost is supplied to the drive circuit 6 as electric power for driving the fuel injection valve 2.

The battery voltage VB and the boost voltage Vboost are input to the drive circuit 6. Although not shown, the drive circuit 6 includes transistors, and selects one as a ("discharge") transistor for applying the boost voltage Vboost to the solenoid coil 2a of the fuel injection valve 2 of one or more of the four cylinders, a ("constant current") transistor for applying the battery voltage VB, and a ("downstream" or "lower arm") transistor for selecting a cylinder having the relevant solenoid coil 2a to be energized. Note, upstream transistors and/or downstream transistors may be used to select a relevant solenoid coil. The ON and OFF of each of the transistors of the drive circuit 6 are controlled by the energization controller 15. As a result, the drive circuit 6 applies a voltage to the solenoid coil 2a based on the energization control of the energization controller 15 to drive the fuel injection valve 2.

The current detector 7 is composed of a current detection resistor (not shown) or the like, and detects the electric current flowing through the solenoid coil 2a. The current monitor 16 of the control IC 5 is configured by using, for example, a comparison unit using a comparator (not shown), an A/D converter, or the like, and monitors an energization current value EI via the current detector 7, based on the value of the electric current actually flowing through the solenoid coil 2a of the fuel injection valve 2 of each of the cylinders. The control IC 5 stores an energization current profile PI showing an ideal relationship between an energization time Ti and an energization current value, which is for obtaining an "ideal" energization current integration value of the fuel injection valve 2 according to the instruction signal TQ. Note, a current integrated over time equals a charge. For example, a constant current of one amp (or one coulomb per second) integrated over a time of one second equals one coulomb of charge. Similarly, power (current× voltage) may be integrated over time to yield an energy in Joules, or in some other convenient energy unit.

The energization controller 15 of the control IC 5 executes current control for the fuel injection valve 2 via the drive circuit 6 based on the energization current profile PI. That is, the energization controller 15 controls energization of the fuel injection valve 2 based on the instruction energization time according to the instruction signal TQ. In the control of the fuel injection valve 2, the gradient of the energization current of the fuel injection valve 2 is lower than the one in the energization current profile PI due to various factors such as the ambient temperature environment and aging deterioration, and the actual injection amount which is actually injected amount of fuel decreases from the target injection amount. In particular, when the microinjection is performed as multi-stage injections, the boost voltage Vboost drops substantially, and the actual injection amount tends to be lower than the target injection amount.

On the other hand, when the fuel injection valve 2 is energized and controlled, a fuel injection amount is controllable according to, that is, in proportion to the integration value of the energization current (in other words, in proportion to a delivered charge in coulombs). Therefore, the area corrector 17 calculates a correction time such that an actual charge delivered by an actual current profile EI (also known as an area under the EI profile) is equal to an ideal charge delivered by an ideal current profile PI (also known as an area under the PI profile). In one embodiment, the difference in the delivered charge (during a first period) may be calculated by using geometry to estimate a difference in areas under the profiles. This difference may be used to estimate an additional time (a correction time) that the actual current must stay ON in order to deliver the same charge as the ideal current profile. To summarize, the goal is to provide a correction time such that a charge delivered by the actual current profile EI is equal to a charge delivered by an ideal current profile PI.

The area corrector 17 calculates the correction time $\Delta Ti$ for the energization time. The correction time $\Delta Ti$ is calculable to equate two area sizes, i.e., (a) an area size A1 calculable as an integrated difference between (i) the integrated current of the ideal current profile PI and (ii) the integrated current of the actual current value EI flowing through the fuel injection valve 2 detected by the current detector 7, and (b) an area size A2, shown in FIG. 2.

In such case, in general, the ideal current profile EI is has a lower value at any specific time (between t0 and ta) than the actual current profile EI. Therefore, by performing such a time correction, it is possible to make up for the shortage of the actual energization current integration value for the fuel injection valve 2 according to the instruction signal TQ, that is, the shortage of the fuel injection amount is compensated to determine/obtain an appropriate fuel injection amount. Thus, the correction time $\Delta Ti$ calculated as described above causes the energization controller 15 to correct, i.e., to extend, the energization time, and as a result, the shortage of the fuel injection amount (associated with the actual delivered charge) described above is compensated.

As a method for calculating the correction time $\Delta Ti$, for example, the following method can be adopted. That is, in the ideal current profile PI and the actual current value EI, time t1$n$ and time t1 to reach a first current threshold value I1 are obtained, and time t2$n$ and time t2 to reach a second current threshold value I2 are obtained. Then, the area size A1 is estimated from the above, and the correction time $\Delta Ti$ is calculated to obtain the area size A2 equivalent to the area size A1. By executing such a current area correction control, it is possible to obtain an appropriate fuel injection amount of the fuel injection valve 2 according to the instruction signal TQ. For example, the points (t1n, I1), (t1, I1), (t2n, I2), and (t2, I2) in FIG. 2 may be used to calculate an area of a trapezoid, and the trapezoidal area may be used to estimate an area between the profiles. The area between the profiles is a difference of the integrated profiles in the time range of t0 to ta.

As shown in FIG. 1, the correction time ΔTi calculated by the area corrector 17 of the control IC 5 is given to the microcomputer 4. In the microcomputer 4, the abnormality determiner 12 determines the occurrence of an abnormality related to the area correction based on the correction time ΔTi given by the area corrector 17. Specifically, the abnormality determiner 12 determines that an abnormality related to the area correction has occurred when the correction time ΔTi reaches the upper limit value Tmax.

In one embodiment, the goal is for the actual delivered charge to equal the ideal delivered charge. For simplicity, we may consider delivered charges only to the respective current peaks (when the discharge transistor is turned OFF). Specifically, we consider the actual delivered charge (Qactual) from t0 to tb, and consider the ideal delivered charge (Qideal) from t0 to ta.

$$Q\text{ideal} = \int_{t0}^{ta=Ti}(PI)dt$$

wherein PI is the current profile of the ideal current.

$$Q\text{actual} = \int_{t0}^{tb=(Ti+\Delta Ti)}(EI)dt = \int_{t0}^{Ti}(EI)dt + \int_{Ti}^{Ti+\Delta Ti}(EI)dt$$

wherein EI is the current profile of the actual current.

As stated, the goal is Qideal=Qactual. Substituting the above equations into our goal equation, we have:

$$\int_{t0}^{Ti}(PI)dt = \int_{t0}^{Ti}(EI)dt + \int_{Ti}^{Ti+\Delta Ti}(EI)dt$$

Subtracting one of the terms from both sides yields:

$$\int_{t0}^{Ti}(PI)dt - \int_{t0}^{Ti}(EI)dt = \int_{Ti}^{\Delta Ti}(EI)dt$$

Simplifying the left side of the equation yields:

$$\int_{t0}^{Ti}\{(PI)-(EI)\}dt = \int_{Ti}^{\Delta Ti}(EI)dt$$

Figure 2:
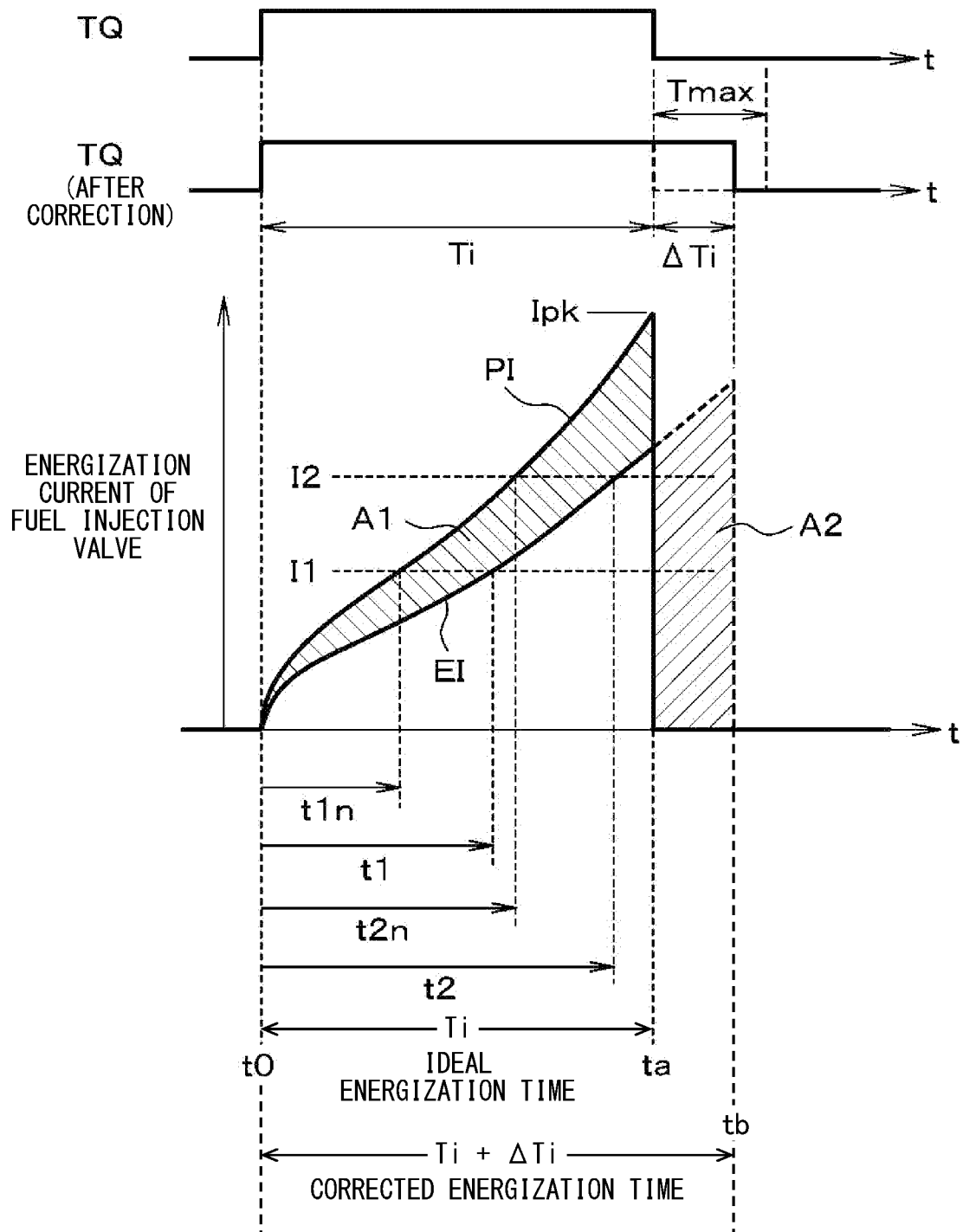
FIG. 2 is a diagram for explaining a current area correction control according to the first embodiment, and is a diagram showing a relationship between an energization time and an energization current of a fuel injection valve.

The left term in the above equation is shown graphically by the shaded area A1 in FIG. 2. The right term in the above equation is shown by the area A2 in FIG. 2. Substituting these areas into the above equation yields: A1=A2.

Thus, in one embodiment the area A1 is estimated in real time, and then the corrected time ΔTi is estimated such that A1=A2. The basis for this embodiment is that fuel delivered by the fuel injector is strongly associated with charge (integrated current) delivered by the discharge transistor (not shown) from the boost circuit 3.

In another embodiment, not shown, is to perform a similar calculation to equalize a delivered energy (integrated power). In this case, an actual delivered energy (Eactual) should equal an ideal delivered energy (Eideal). The basis for this embodiment is that fuel delivered by the fuel injector is strongly associated with energy (integrated power) delivered by the discharge transistor (not shown) from the boost circuit 3.

An area analogous to A1 may be calculated for power profiles at times t1n, t1, t2n, and t2 shown in FIG. 2. These times may be identified using comparators that compare a detection voltage (measured across a shunt/detection resister optionally located downstream of the coil) against a first known voltage associated with the threshold current I1, and/or against a second known voltage associated with the threshold current I2.

The following factors (A) to (C) can be considered as causing such abnormalities related to area correction control, that is, abnormalities in which the correction time ΔTi reaches or exceeds the upper limit value Tmax.

(A) The correction time ΔTi exceeded the upper limit value Tmax due to the deterioration of the boost capacitor 3a, or some other deterioration.

(B) An unknown abnormality occurred in the process of calculating the correction time ΔTi by the control IC 5.

(C) The electric current waveform at the time of injection, that is, the energization current value EI, is obtained as an erroneous value by the control IC 5, and the correction time ΔTi is calculated based on such an erroneous value, resulting in the correction time ΔTi exceeding the upper limit value Tmax.

When the abnormality determiner 12 determines that an abnormality related to the area correction has occurred, the microcomputer 4 outputs a stop instruction for instructing the control IC 5 to stop the current area correction. As a result, the control of the current area correction is stopped in the control IC 5, preventing the abnormal area correction control from being continuously performed. In the following description, the period during which the control of the current area correction is stopped is referred to as a fail-safe period (or a fail-safe time).

Since the abnormality related to the control of the area correction occurs based on the above-mentioned factors, the abnormality may be resolved spontaneously or by a counter-measure. Then, after the abnormality related to the area correction control occurs, when such abnormality is resolved, it may be preferable to promptly return to the normal control. Therefore, after shifting to the fail-safe period, the normal-return determiner 13 executes a normal-return determination, determining whether or not an abnormal state in which the area correction-related abnormality has occurred and then has returned to a normal state in which such abnormality no longer exists. In such case, after a determination of the abnormality determiner 12 determining that an abnormality has occurred, the normal-return determiner 13 performs the normal-return determination at an execution timing at which a degree of influence of the abnormality on the emission of the internal combustion engine becomes equal to or less than a predetermined value.

The normal-return determination is executed based on the correction time ΔTi calculated when the area correction control is restarted. Specifically, in the normal-return determination, (i) when the correction time ΔTi calculated by the control of the restarted area correction is less than the upper limit value Tmax, it is determined that the normal state has been restored, and, (ii) when the correction time ΔTi is equal to the upper limit value Tmax or more, it is determined that the normal state has not been restored, that is, the abnormal state is continuing. In the present embodiment, the normal-return determiner 13 determines the execution timing based on (i) the (maximum) actual injection amount, which is a fuel injection amount when the correction time ΔTi reaches the upper limit value Tmax and (ii) the target injection amount. Note that the actual injection amount (of fuel) can be roughly obtained based upon the actual charge delivered by the actual current profile EI (from t0 to tb, including the correction time ΔTi if any).

The following indicators can be considered as indicators of the degree of influence on emission. First, as shown in the following equation (1), it is conceivable to use, as an indicator, a ratio R1 of the actual fuel injection amount against a target injection amount when the correction time ΔTi reaches the upper limit value Tmax.

$$R1 = Va/Vr \qquad \text{(Equation 1A)}$$

In equation 1A, the injected fuel is measured in volume, then R1=Va/Vr (actual fuel injection volume including Tmax for EI/target or ideal fuel injection volume for PI). An analogous equation may use a mass ratio of the injected fuel.

$$R1=Qa/Qr \quad \text{(Equation 1B)}$$

In Equation 1B, this ratio R1 may be estimated based upon delivered charge, such that R1=Qa/Qr (actual charge delivered including Tmax for EI/target or ideal charge delivered for PI). Note, frequently the letter "Q" is used by Electrical Engineers to represent charge.

$$R1=Ea/Er. \quad \text{(Equation 1C)}$$

In Equation 1C, a ratio of delivered energies may be used. For example, R1=Ea/Er (actual energy delivered/target or ideal energy delivered).

The normal-return determiner 13 can determine that the closer the ratio R1 is to 1, the smaller the degree of influence on the emission is, and that further away the ratio R1 is from 1, the greater the degree of influence on the emission is.

Further, as shown in the following equation (2), it is conceivable to use, as an indicator, a difference D between the actual fuel injection amount Qa and the target injection amount Qr when the correction time ΔTi reaches the upper limit value Tmax.

$$D=Qa-Qr \quad \text{(Equation 2)}$$

$$D=\text{absolutevalue}\{Qa-Qr\} \quad \text{(alternative Equation 2-ALT)}$$

When such an indicator is adopted, the normal-return determiner 13 can determine that the smaller the difference D is (in absolute magnitude), the smaller the degree of influence on the emission is, and that the greater the difference D is, the greater the degree of influence on the emission is. To summarize, respective equations for (i) volume, for (ii) charge (using Q notation), and for (iii) energy are: (i) D=Va−Vr, and (ii) D=Qa−Qr, and (iii) D=Ea−Er.

Further, as shown in the following equation (3), it is conceivable to use, as an indicator, a ratio R2 of (i) the difference D between the actual fuel injection amount Qa and the target injection amount Qr against (ii) the target injection amount Qr when the correction time ΔTi reaches the upper limit value Tmax.

$$R2=(Qa-Qr)/Qr=D/Qr \quad \text{(Equation 3)}$$

$$R2=\text{absolutevalue}\{Qa-Qr\}/Qr \quad \text{(alternative Equation 3-ALT)}$$

Similar to the above discussion of equations 1 and 2, corresponding equations for volume, or for mass, or for charge (using Q notation), or for energy are analogous. When such an indicator is adopted, the normal-return determiner 13 can determine that the smaller the ratio R2 is, the smaller the degree of influence on the emission is, and that the greater the ratio R2 is, the smaller the degree of influence on the emission is.

Therefore, in the present embodiment, the normal-return determiner 13 determines the execution timing by using any one of the following three specific methods. In the first method, the normal-return determiner 13 determines a timing of when the ratio R1 of the actual fuel injection amount Qa against the target injection amount Qr when the correction time ΔTi reaches the upper limit value Tmax is equal to or greater than a predetermined first threshold value as the execution timing. The first threshold value is a predetermined value greater than 0 and less than 1, and may be appropriately set to a value within a range in which a desired effect can be obtained according to the specifications of the device and the like.

In the second method, the normal-return determiner 13 determines a timing of when the difference D between the actual fuel injection amount Qa and the target injection amount Qr when the correction time ΔTi reaches the upper limit value Tmax is equal to or less than a predetermined second threshold value as the execution timing. In the third method, the normal-return determiner 13 determines a timing of when the ratio R2 of the difference D between the actual fuel injection amount Qa and the target injection amount Qr against the target injection amount Qr (when the correction time ΔTi reaches the upper limit value Tmax) is equal to or less than a predetermined third threshold value as the execution timing. The second threshold value and the third threshold value may be appropriately set to values within a range in which the desired effect can be obtained according to the specifications of the device and the like.

Alternatively, analogous equations and conditions may be used, based upon comparing an actual energy delivered (an integrated power) to an ideal energy delivered. Alternatively, any logic tests may account for D having a negative value, but without using the relatively complex absolutevalue function.

Next, the operation of the above configuration is described with reference to FIGS. 3 to 6. In the following, an example is described as a multi-stage injection, in which the injection originally performed once per cycle is divided into, for example, five stages (or 5 portions, or 5 pulses). Therefore, in FIGS. 3 to 6 and the following description, in one cycle of multi-stage injections, the first injection is referred to as a first-stage injection, the second injection is referred to as a second-stage injection, the third injection is referred to as a third-stage injection, the fourth injection is referred to as a fourth-stage injection, and the fifth injection is referred to as a fifth-stage of injection. In FIGS. 3 to 6, the electric current waveform shown by a broken line indicates an ideal current waveform having a slope in which the target injection amount can be obtained by the energization of the energization time corresponding to the instruction signal TQ output from the microcomputer 4.

Figure 3:
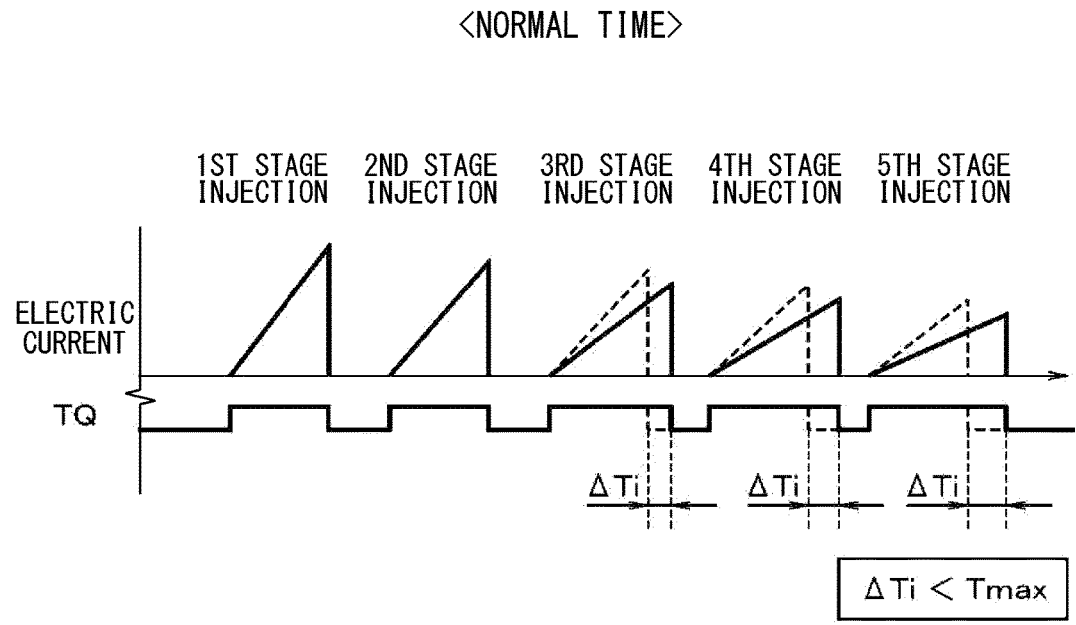
FIG. 3 is a diagram for explaining an operation in a normal state, and is a timing chart showing the energization current and an instruction signal according to the first embodiment.

[1] Operation of Normal Time in FIG. 3

As shown in FIG. 3, in the normal state, which may also be designated as normal time, i.e., when no abnormality related to area correction control has occurred, the actual injection amount and the target injection amount match for the first-stage injection and the second-stage injection, making the correction time ΔTi approximately equal to zero, and the energization time is not extended (i.e., is not corrected). Further, in the normal time, the slope of the current flowing through the fuel injection valve 2 becomes smaller than the ideal slope in all of the third-stage injection and the fourth-stage injection and the fifth-stage injection due to a decrease in the boost voltage Vboost or the like. As a result, the actual injection amount becomes lower than the target injection amount when the injection is performed by the (ideal) energization time corresponding to the instruction signal TQ.

Therefore, in the third-stage injection, the fourth-stage injection, and the fifth-stage injection, the energization time is extended by the correction time ΔTi by the control of the current area correction, thereby compensating for the predicted shortage of the fuel injection amount. In such case, the correction time ΔTi is a value less than the upper limit value Tmax in any of the third-stage injection, the fourth-stage injection, and the fifth-stage injection. Therefore, in the normal time, the abnormality determiner 12 determines that an abnormality related to the area correction control has not occurred.

Figure 4:
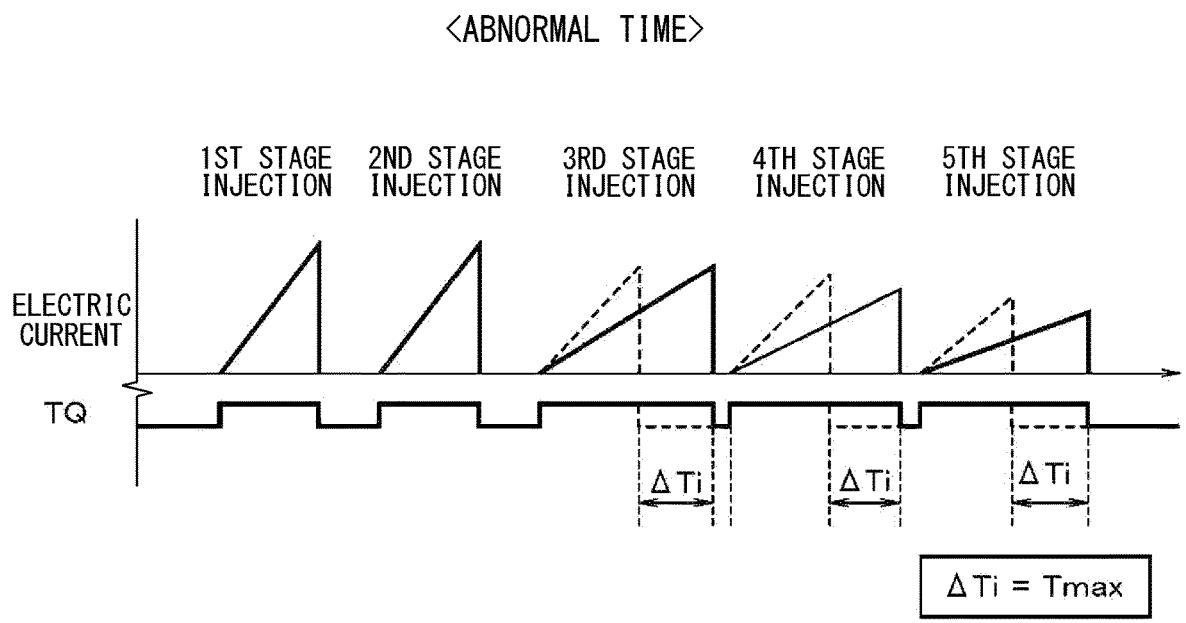
FIG. 4 is a diagram for explaining the operation when an abnormality occurs, and is a timing chart showing the energization current and the instruction signal according to the first embodiment.

[2] Operation of Abnormal Time in FIG. 4

Here, an operation at the time of occurrence of an abnormality is described as an example in which an abnormality related to the area correction control has occurred in the third-stage injection, the fourth-stage injection, and the fifth-stage injection. In such case, as shown in FIG. 4, since no abnormality has occurred in the first-stage injection and the second-stage injection, the operation is the same as in the normal time. On the other hand, in the third-stage injection, the fourth-stage injection, and the fifth-stage injection, since the slope of the electric current flowing through the fuel injection valve 2 is smaller than the ideal slope, the control of the current area correction is performed and the energization time is extended by the correction time $\Delta Ti$.

However, in such case, since unknown abnormality has occurred, the correction time $\Delta Ti$ is equal to the upper limit value Tmax in all of the third-stage injection, the fourth-stage injection, and the fifth-stage injection, that is, it is in a situation of sticking to the the upper limit value Tmax. Therefore, in the abnormal time of when an abnormality occurs, the abnormality determiner 12 determines that an abnormality related to area correction control has occurred. Then, upon receiving such a determination, a stop instruction is output from the microcomputer 4, whereby the control of the current area correction by the control IC 5 is stopped.

Figure 5:
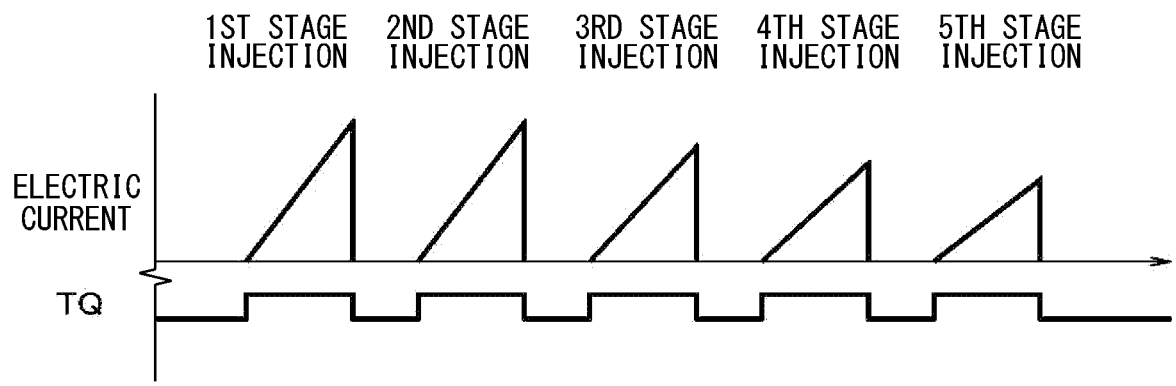
FIG. 5 is a diagram for explaining the operation at a fail-safe time, and is a timing chart showing the energization current and the instruction signal according to the first embodiment.

[3] Operation of Fail-Safe Time, FIG. 5

As described above, when fail-safe operation is performed, the control of the current area correction by the control IC 5 is stopped. Therefore, at the time of performing the fail-safe operation, the energization time is not extended in any of the first-stage injection, the second-stage injection, the third-stage injection, the fourth-stage injection, and the fifth-stage injection. Therefore, for the third-stage injection, the fourth-stage injection and the fifth-stage injection in which the slope of the electric current flowing through the fuel injection valve 2 is smaller than the ideal slope, the injection is performed as is, i.e., the actual injection amount is lower than the target injection amount.

Figure 6:
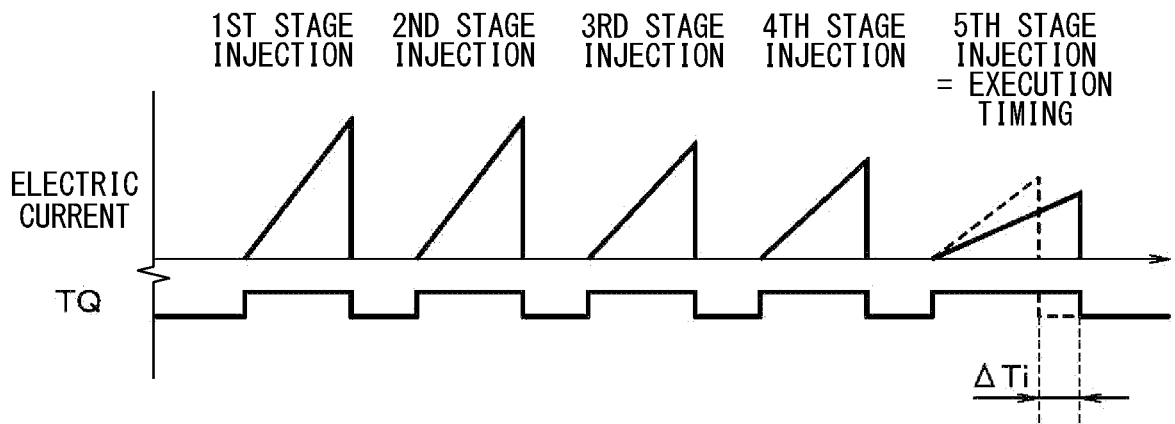
FIG. 6 is a diagram for explaining the operation at a normal-return determination time, and is a timing chart showing the energization current and the instruction signal according to the first embodiment.

[4] Operation of Normal-Return Determination Time, FIG. 6

Here, of the third-stage injection, the fourth-stage injection, and the fifth-stage injection in which an abnormality occurs and in which the correction time $\Delta Ti$ sticks to the upper limit value Tmax, based on an assumption that the third-stage injection has the greatest influence on emission and the fifth-stage injection has the smallest influence on the emission, the operation at the time of normal-return determination is described as an example. In such case, the normal-return determiner 13 determines that the fifth-stage injection has the smallest influence on the emission based on at least one of the previously discussed first method (A), the second method (B), and the third method (C), and determines that the fifth-stage injection may be corrected. As a result, as shown in FIG. 6, the area correction control is maintained in a stop state in the third and fourth-stage injections, but the area correction control is restarted in the fifth-stage injection.

The normal-return determiner 13 determines whether or not the normal state has been restored from the abnormal state based on whether or not the correction time $\Delta Ti$ in the fifth-stage injection in which the area correction control is restarted is less than the upper limit value Tmax. In such case, although the normal-return determiner 13 determines only the fifth-stage injection, which has the least influence on the emission, as the execution timing among the third-stage injection, the fourth-stage injection, and the fifth-stage injection in which an abnormality occurs, in addition to or instead of such a determination, the fourth-stage injection, which has the second smallest influence on the emission, may also be corrected in a next cycle.

According to the present embodiment described above, the normal-return determiner 13 executes the normal-return determination to determine whether or not the normal state has been restored from the abnormal state in which the correction-related abnormality has occurred, at the execution timing at which the degree of influence of the abnormality on the emission becomes equal to or less than a predetermined value after the determination of the abnormality determiner 12 that an abnormality has occurred. In such manner, the normal-return determination is executed at the execution timing that has a relatively small influence on the emission (because the correction is initially only performed upon the most unimportant stage. Therefore, even if the abnormality has not been resolved at such timing of executing the normal-return determination, the (single stage) fuel injection for the normal-return determination is performable with low or nominal influence on the emission. Therefore, according to the configuration of the present embodiment, it is possible to determine whether or not the abnormal state in which the area correction abnormality has occurred has returned to the normal state while minimizing the influence on the emission.

In the above configuration, the closer the actual fuel injection amount to the target injection amount when the correction time $\Delta Ti$ reaches the upper limit value Tmax, the lower the influence of the fuel injection for the normal-return determination on the emission is. Therefore, the normal-return determiner 13 determines the execution timing based on the actual fuel injection amount Qa when the correction time $\Delta Ti$ reaches the upper limit value Tmax and the target injection amount Qr. Specifically, the normal-return determiner 13 determines the execution timing based on any one of the first method, the second method, and the third method using the fuel injection amount Qa and the target injection amount Qr. In such manner, the normal-return determination can be reliably executed at a timing when the influence on the emission is low or nominal.

Figure 7:
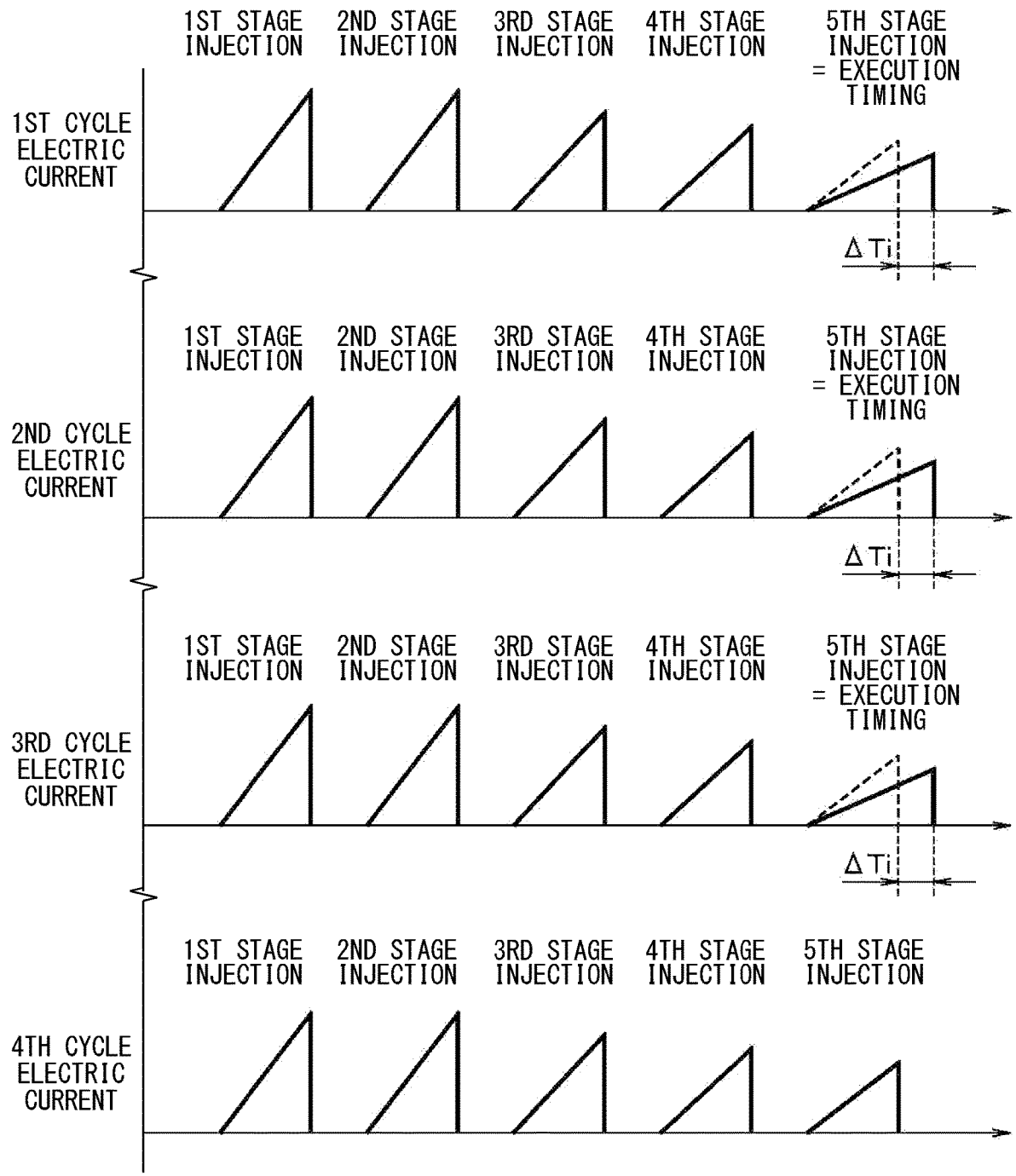
FIG. 7 is a diagram for explaining the normal-return determination, and is a timing chart No. 1 showing the energization current in multiple cycles according to a second embodiment.

Second Embodiment, FIG. 7, 8

The second embodiment of the present disclosure is described with reference to FIGS. 7 and 8. The normal-return determiner 13 can execute the normal-return determination multiple times, and can determine whether or not the abnormal state has returned to the normal state based on the multiple determination results. Therefore, in the present embodiment, two specific patterns for executing the normal-return determination multiple times are described.

[1] First Pattern, FIG. 7 (Good Specific Stage in Multiple Cycles)

As shown in FIG. 7, in the first pattern, the normal-return determination is executed in one, specific stage in each of multiple cycles. In such case, the normal-return determiner 13 determines the fifth-stage injection as the execution timing in each of the first cycle, the second cycle, and the third cycle. As a result, the area correction control is restarted in the fifth-stage injection in each of the first cycle, the second cycle, and the third cycle. The normal-return determiner 13 determines whether or not the abnormal state has returned to the normal state based on whether or not the correction time $\Delta Ti$ in the fifth-stage injection in the three cycles in which the control of the area correction has been restarted is less than the upper limit value Tmax.

More specifically, when the normal-return determiner 13 determines that the correction time ΔTi in each of all the fifth-stage injections in the first cycle, the second cycle, and the third cycle is less than the upper limit value Tmax, it is determined that the normal state has been restored. In such manner, the normal area correction control is restarted from the injection in the fourth cycle. Further, when the normal-return determiner 13 determines that the correction time ΔTi of at least one of the fifth-stage injections either in the first cycle, the second cycle, or the third cycle is equal to or higher than the upper limit value Tmax, it is determined that the abnormal state is continuing, i.e., is not yet resolved. In such manner, the injection in and after the fourth cycle is executed again as the fail-safe time operation in which the area correction control is stopped.

Figure 8:
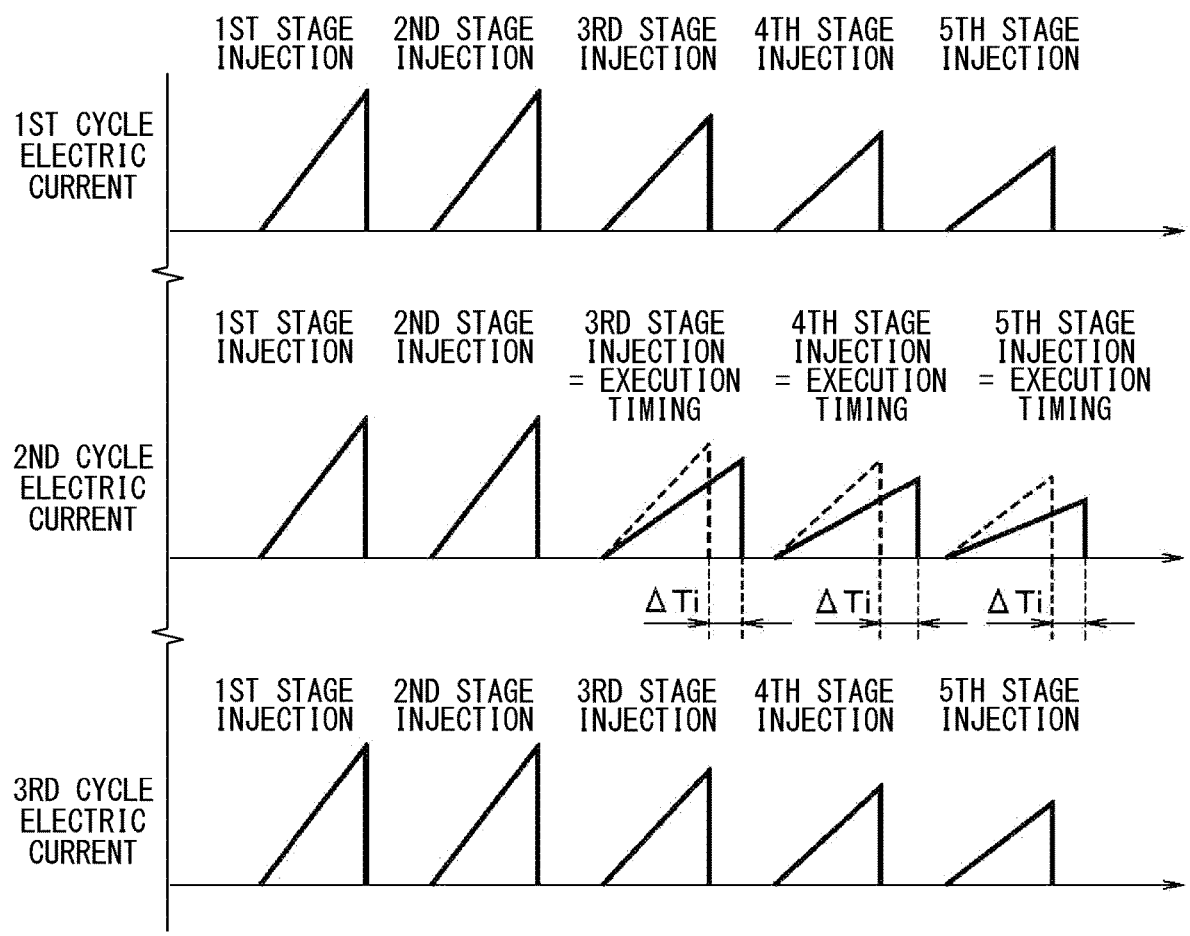
FIG. 8 is a diagram for explaining the normal-return determination, and is a timing chart No. 2 showing the energization current in multiple cycles according to the second embodiment.

[2] Second Pattern, FIG. 8 (Multiple Good Stages in Single Cycle)

As shown in FIG. 8, in the second pattern, the normal-return determination is executed multiple times in one cycle. In such case, the normal-return determiner 13 determines the third-stage injection, the fourth-stage injection, and the fifth-stage injection in the second cycle as execution timings of the normal-return determination. In such manner, the area correction control is restartable either in the third-stage injection, the fourth-stage injection, or the fifth-stage injection in the second cycle. The normal-return determiner 13 determines whether or not the abnormal state has returned to the normal state based on whether or not the correction time ΔTi in the third-stage injection, the fourth-stage injection, and the fifth-stage injection in the second cycle in which the area correction control is restarted is less than the upper limit value Tmax.

More specifically, when the normal-return determiner 13 determines that the correction time ΔTi in each of all the third-stage injection, the fourth-stage injection, and the fifth-stage injection in the second cycle is less than the upper limit value Tmax, it is determined that the normal state has been restored. In such manner, the normal area correction control is restarted from the injection in the third cycle. Further, when the normal-return determiner 13 determines that the correction time ΔTi of at least one of the third-stage injection, the fourth-stage injection, or the fifth-stage injection in the second cycle is equal to or higher than the upper limit value Tmax, it is determined that the abnormal state is continuing, i.e., is not yet resolved. In such manner, the injection in and after the third cycle is executed again as the fail-safe time operation in which the area correction control is stopped.

According to the present embodiment described above, the normal-return determiner 13 executes the normal-return determination multiple times, and determines whether or not the abnormal state has returned to the normal state based on the determination results of multiple times. In such manner, an erroneous determination in which the abnormal state is erroneously determined to have returned to the normal state even though the abnormal state is actually continuing is prevented, and, as a result, deterioration of the emission after returning to the normal state due to the erroneous determination is more reliably preventable.

[3] Third Pattern, not Shown

In a third pattern, multiple good stages in multiple cycles must occur before restarting the normal area correction control. For example, the calculated correction time must be less than the maximum correction time in a third, fourth, and fifth stage of a first cycle, and in a third, fourth and fifth stage of a second cycle, and in a third fourth and fifth stage of a third cycle.

Other Embodiments

The present disclosure is not limited to the embodiments that have been described above and illustrated in the drawings, but can arbitrarily be modified, combined, or expanded without departing from the gist of the present disclosure. The numerical values and the like shown in the embodiments described above are examples, and the embodiments are not limited to those examples. Each of the above embodiments has been applied to in-cylinder injection as a fuel injection valve 2 that directly injects fuel into the combustion chamber of an internal combustion engine, but the present disclosure is not limited to the above embodiments, i.e., the present disclosure may also be applicable to a well-known port injection that injects fuel to a part in front of an intake valve. The microcomputer 4 and the control IC 5 may be integrated and implemented as one-body element/component, and in such case, it may be desirable to use an arithmetic processing unit capable of performing high-speed calculation.

In each of the above embodiments, when executing the area correction control for the fuel injection valve 2, a simplified method is adopted for the calculation of both of (i) the energization current profile PI and (ii) the actual energization current EI, in which (a) firstly calculating (a-1) time t1$n$ and time t1 to reach the first current threshold value I1 and (a-2) time t2$n$ and time t2 to reach the second current threshold value I2 and (b) then estimating the area size A1 based on t1$n$, t1, t2$n$, t2. However, the calculation of the correction time ΔTi may also be performable by any method other than the above. The execution timing of the normal-return determination by the normal-return determiner 13 is not necessarily limited to that described in each of the above embodiments, but may be appropriately changed therefrom as long as the execution timing is set to the one at which the degree of influence of the abnormality on the emission is equal to or less than a predetermined value.

Although the disclosure has been described in accordance with the examples, i.e., the embodiments, it is understood that the present disclosure is not limited to the above examples or structures. The present disclosure also encompasses various modifications and variations within an equivalent range. In addition, while the various elements are shown in various combinations and configurations, which are exemplary, other combinations and configurations, including more, less or only a single element, are also within the spirit and scope of the present disclosure.

The controller and the techniques thereof according to the present disclosure may be implemented by one or more special-purpose computers. Such a special-purpose computer may be provided (i) by configuring (a) a processor and a memory programmed to execute one or more functions embodied by a computer program, or (ii) by configuring (b) a processor including one or more dedicated hardware logic circuits, or (iii) by configuring by a combination of (a) a processor and a memory programmed to execute one or more functions embodied by a computer program and (b) a processor including one or more dedicated hardware logic circuits. The computer programs may be stored, as instructions to be executed by a computer, in a tangible, non-transitory computer-readable storage medium.

What is claimed is:

1. An injection control device that controls fuel injection by driving a fuel injection valve that supplies fuel to an internal combustion engine with an electric current, the injection control device comprising:
    an instruction output unit outputting an instruction energization time that is an instruction value of the energization time of the fuel injection valve corresponding to a target injection amount that is a target value of a fuel injection amount of the fuel injection valve;
    an energization controller controlling energization of the fuel injection valve based on the instruction energization time;
    an area corrector correcting an area of the electric current flowing through the fuel injection valve when the fuel injection valve is driven by the electric current, calculating a correction time of the energization time, and correcting the instruction energization time;
    an abnormality determiner determining that an abnormality related to the area correction has occurred when the correction time reaches a predetermined upper limit value; and
    a normal-return determiner executing, after the abnormality determiner determines that the abnormality related to the area correction has occurred, a normal-return determination at an execution timing of when a degree of influence of the abnormality on an emission becomes equal to or less than a predetermined value, the normal-return determination executed to determine whether or not an abnormal state in which the abnormality related to the area correction has been caused has returned to a normal state.

2. The injection control device of claim 1, wherein
the normal-return determiner determines the execution timing of the normal-return determination based on the fuel injection amount and the target injection amount when the correction time reaches the upper limit value.

3. The injection control device of claim 2, wherein
the normal-return determiner determines the execution timing of the normal-return determination as a timing of when a ratio of the fuel injection amount against the target injection amount when the correction time reaches the upper limit value is equal to or greater than a predetermined first threshold value.

4. The injection control device of claim 2, wherein
the normal-return determiner determines the execution timing of the normal-return determination as a timing of when a difference between the fuel injection amount and the target injection amount when the correction time reaches the upper limit value is equal to or less than a predetermined second threshold value.

5. The injection control device of claim 2, wherein
the normal-return determiner determines the execution timing of the normal-return determination as a timing of when a ratio of (i) a difference between the fuel injection amount and the target injection amount against (ii) the target injection amount when the correction time reaches the upper limit value is equal to or less than a predetermined third threshold value.

6. The injection control device of claim 1, wherein
the normal-return determiner executes the normal-return determination multiple times, and determines whether or not the abnormal state has returned to the normal state based on determination results of multiple time determinations.

7. An injection control device for controlling fuel injection by driving a fuel injection valve that supplies fuel to an internal combustion engine, the injection control device comprising:
    a processor; and
    a non-transitory computer-readable storage medium,
    wherein the injection control device is configured to:
    output an instruction energization time that is an instruction value of the energization time of the fuel injection valve corresponding to a target injection amount that is a target value of a fuel injection amount of the fuel injection valve;
    control energization of the fuel injection valve based on the instruction energization time;
    correct an area of the electric current flowing through the fuel injection valve when the fuel injection valve is driven by the electric current, calculating a correction time of the energization time, and correcting the instruction energization time;
    determine that an abnormality related to the area correction has occurred when the correction time reaches a predetermined upper limit value; and
    execute, after the abnormality determiner determines that the abnormality related to the area correction has occurred, a normal-return determination at an execution timing of when a degree of influence of the abnormality on an emission becomes equal to or less than a predetermined value, the normal-return determination executed to determine whether or not an abnormal state in which the abnormality related to the area correction has been caused has returned to a normal state.

8. The injection control device of claim 7, wherein the injection control device is further configured to:
    determine the execution timing of the normal-return determination based on the fuel injection amount and the target injection amount when the correction time reaches the upper limit value.

9. The injection control device of claim 8, wherein the injection control device is further configured to:
    determine the execution timing of the normal-return determination as a timing of when a ratio of the fuel injection amount against the target injection amount when the correction time reaches the upper limit value is equal to or greater than a predetermined first threshold value.

10. The injection control device of claim 8, wherein the injection control device is further configured to:
    determine the execution timing of the normal-return determination as a timing of when a difference between the fuel injection amount and the target injection amount when the correction time reaches the upper limit value is equal to or less than a predetermined second threshold value.

11. The injection control device of claim 8, wherein the injection control device is further configured to:
    determine the execution timing of the normal-return determination as a timing of when a ratio of (i) a difference between the fuel injection amount and the target injection amount against (ii) the target injection amount when the correction time reaches the upper limit value is equal to or less than a predetermined third threshold value.

12. The injection control device of claim 7, wherein the injection control device is further configured to:
   execute the normal-return determination multiple times, and determines whether or not the abnormal state has returned to the normal state based on determination results of multiple time determinations.

* * * * *